United States Patent
Kalibjian (10) Patent No.: US 11,017,687 B2
(45) Date of Patent: May 25, 2021

(54) INFORMATION TECHNOLOGY USER BEHAVIOR MONITORING RULE GENERATION

(71) Applicant: Ent. Services Development Corporation LP, Houston, TX (US)

(72) Inventor: Jeff Kalibjian, Livermore, CA (US)

(73) Assignee: ENT. SERVICES DEVELOPMENT CORPORATION LP, Houston, TX (US)

(*) Notice: Subject to any disclaimer, the term of this patent is extended or adjusted under 35 U.S.C. 154(b) by 169 days.

(21) Appl. No.: 15/421,093

(22) Filed: Jan. 31, 2017

(65) Prior Publication Data

US 2018/0218628 A1 Aug. 2, 2018

(51) Int. Cl.
| | |
|---|---|
| *G09B 7/077* | (2006.01) |
| *G06F 21/62* | (2013.01) |
| *G09B 5/02* | (2006.01) |
| *G09B 7/10* | (2006.01) |
| *G09B 5/12* | (2006.01) |
| *G09B 19/00* | (2006.01) |

(52) U.S. Cl.
CPC .............. *G09B 7/077* (2013.01); *G06F 21/62* (2013.01); *G09B 5/02* (2013.01); *G09B 5/12* (2013.01); *G09B 7/10* (2013.01); *G09B 19/00* (2013.01)

(58) Field of Classification Search
CPC . G09B 7/077; G09B 7/10; G09B 5/02; G09B 5/12; G06F 21/62
See application file for complete search history.

(56) References Cited

U.S. PATENT DOCUMENTS

| | | | | |
|---|---|---|---|---|
| 7,533,155 | B2* | 5/2009 | Kitada | G06Q 10/06 705/34 |
| 7,606,801 | B2 | 10/2009 | Faitelson | |
| 7,975,150 | B1* | 7/2011 | Lillibridge | G06F 17/30867 380/277 |
| 8,170,902 | B2* | 5/2012 | Kennis | G06Q 10/06 705/7.28 |
| 8,447,722 | B1* | 5/2013 | Ahuja | G06F 21/606 707/607 |
| 8,732,089 | B1* | 5/2014 | Fang | G06Q 20/389 705/67 |
| 8,756,653 | B2 | 6/2014 | Jacobson | |
| 8,776,168 | B1 | 7/2014 | Gibson | |
| 9,264,449 | B1 | 2/2016 | Roth | |
| 9,398,029 | B2 | 7/2016 | Sadeh-Koniecpol | |
| 2005/0183143 | A1* | 8/2005 | Anderholm | G06F 11/3438 726/22 |
| 2008/0020361 | A1* | 1/2008 | Kron | G09B 5/02 434/262 |
| 2008/0091453 | A1* | 4/2008 | Meehan | G06Q 20/341 705/317 |

(Continued)

OTHER PUBLICATIONS

Xiao, X. et al.; Automated Extraction of Security Policies From Natural-language Software Documents; https://pdfs.semanticscholar.org/fa7b/a92cf2cae74327fdfd87dc5ffec696dcd661.pd; Nov. 10-18, 2012.

*Primary Examiner* — Xuan M Thai
*Assistant Examiner* — Sadaruz Zaman
(74) *Attorney, Agent, or Firm* — Polsinelli PC (57) ABSTRACT

Textual indicators are extracted from an electronic document. A rule for monitoring information technology user behavior is generated from the extracted textual indicators.

14 Claims, 4 Drawing Sheets

(56) References Cited

U.S. PATENT DOCUMENTS

| | | | | |
|---|---|---|---|---|
| 2008/0092209 | A1* | 4/2008 | Davis | G06F 21/316 726/2 |
| 2013/0055367 | A1* | 2/2013 | Kshirsagar | G06F 21/316 726/6 |
| 2013/0067546 | A1* | 3/2013 | Thavasi | G06F 21/31 726/7 |
| 2014/0287393 | A1* | 9/2014 | Kumar | A61B 34/35 434/262 |
| 2015/0099252 | A1* | 4/2015 | Anderson | G06T 7/0014 434/257 |
| 2015/0118658 | A1* | 4/2015 | Mayou | A61B 5/165 434/127 |
| 2016/0271448 | A1* | 9/2016 | Edelhaeusser | A63B 24/0021 |
| 2016/0352778 | A1* | 12/2016 | Chari | G06N 20/00 |
| 2017/0032694 | A1* | 2/2017 | Brueckner | G09B 19/0053 |
| 2017/0076618 | A1* | 3/2017 | Smith | G09B 5/02 |
| 2017/0200391 | A1* | 7/2017 | Misra | A63F 13/213 |
| 2018/0293802 | A1* | 10/2018 | Hendricks | G09B 23/30 |
| 2019/0042771 | A1* | 2/2019 | Zhang | G06F 21/604 |
| 2019/0078891 | A1* | 3/2019 | Ellis | G09B 5/02 |
| 2019/0304188 | A1* | 10/2019 | Bridgeman | G09B 5/02 |
| 2020/0125746 | A1* | 4/2020 | Joshi | G06F 21/6245 |
| 2020/0174433 | A1* | 6/2020 | Hughes | G05B 13/048 |
| 2020/0409461 | A1* | 12/2020 | Crowther | G09B 19/24 |

* cited by examiner

FIG. 1

```xml
<?xml version="1.0"?>                              200
<behavior_action_model>
<version_id_date>
[version_id_date]
</ version_id_date >
<negative_behavior>   201
[tag_idenfier]
[alphanumeric_text]
<observation_span>   202
[span_time_in_hours]
</observation_span>
<warning_threshold>   203
[warning_behavior_frequency_integer]
</warning_threshold>
<warning_message>   204
[warning_message]
</warning_message>
<mandatory_training_threshold>
[mandatory_training_behavior_frequency_integer]
</mandatory_training_threshold>
<training_module>
[training_module_link]
</training_module>
<training_pass_score_threshold>
[pass_score_integer]
</training_pass_score_threshold>
<training_max_repeat_frequency>
[training_max_repeat_frequency_integer]
</training_max_repeat_frequency>
<bad_behavior_lock_out_time>
[bad_behavior_lock_out_time_days]
</bad_beahvior_lock_out_time>
</behavior_action_model>
```

INFORMATION TECHNOLOGY USER BEHAVIOR MONITORING RULE GENERATION

BACKGROUND

A company or organization may have many users of the company's or organization's information technology resources. For example, employees are often given laptops and access to networks and other information technology resources, so they can perform their jobs. The behavior of the users with respect to the information technology resources may be managed to minimize network security risks and to protect proprietary data. For instance there may be an expectation that a particular user will not store files on a particular storage array, or a prohibition of using a web browser on particular client devices or servers. Whatever the rules or regulations, a company or organization may employ monitoring tools to track user behavior with respect to information technology resources to determine whether users are comporting themselves in a manner consistent with the rules or regulations.

BRIEF DESCRIPTION OF DRAWINGS

Embodiments are described in detail in the following description with reference to the following figures. The embodiments are illustrated by examples shown in the accompanying figures in which like reference numerals indicate similar elements.

DETAILED DESCRIPTION OF EMBODIMENTS

For simplicity and illustrative purposes, the principles of the embodiments are described by referring mainly to examples thereof. In the following description, numerous specific details are set forth in order to provide an understanding of the embodiments. It will be apparent, however, to one of ordinary skill in the art, that the embodiments may be practiced without limitation to these specific details. In some instances, well known methods and/or structures have not been described in detail so as not to unnecessarily obscure the embodiments.

According to an example of the present disclosure, prescribed Information Technology (IT) user behavior may be extracted from electronic documents to automatically generate cybersecurity rules for monitoring IT user behavior of users. The electronic documents may include an organization's computer security policy documents that describe the IT security policies of the organization. IT user behavior may include user actions performed on computers. Natural language processing (NLP) may be used to determine the prescribed IT user behavior from the electronic documents for automatically generating the rules. The rules may be transmitted or otherwise input to an IT behavior monitoring tool to detect conditions associated with the rules. Accordingly, IT user behavior may be monitored according to the generated rules to protect against cybersecurity threats, such as to protect networks, computers, programs and data from attack, damage or unauthorized access. In an example, training and testing materials may be automatically generated from the IT user behavior information extracted from the electronic documents. The training and testing materials may be used for remedial actions that are performed in response to detecting violations of the prescribed IT user behavior and the cybersecurity rules.

Figure 1:
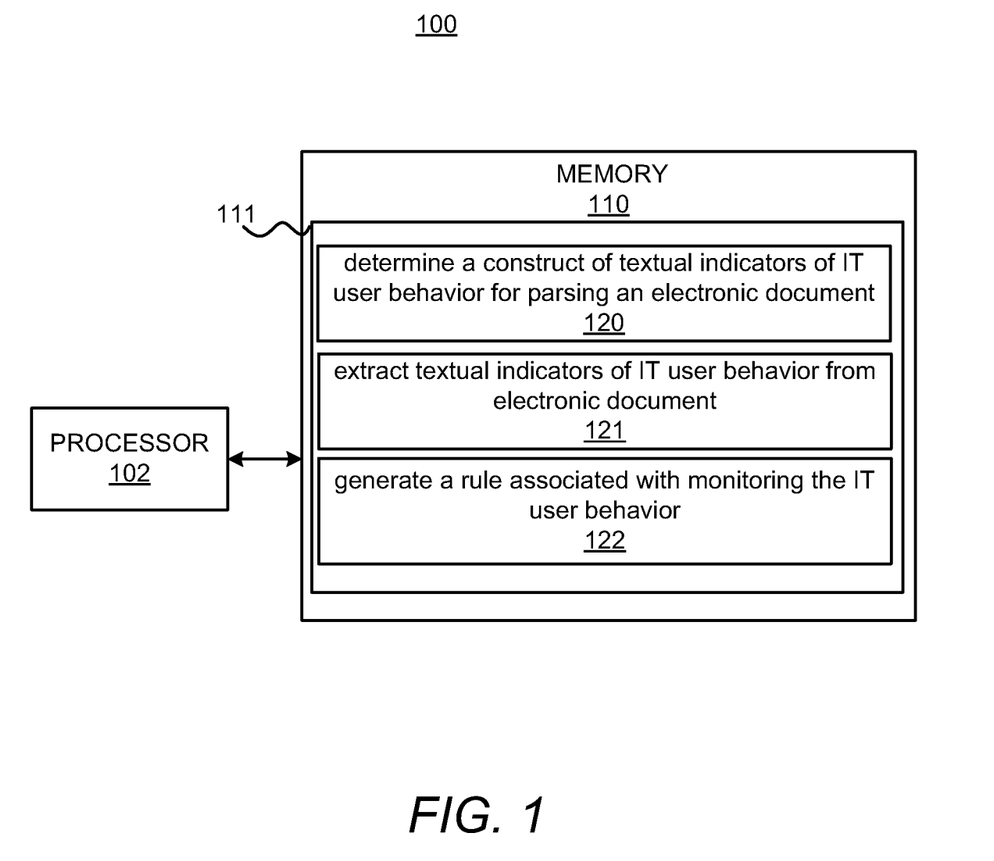
FIG. 1 illustrates a computer system, according to an example.

FIG. 1 shows an example of a computer system 100. It should be understood that the computer system 100 depicted in FIG. 1 may include additional components without departing from a scope of the computer system 100 disclosed herein.

The computer system 100 may include a processor 102 and a memory 110 on which is stored machine readable instructions 111 that the processor 102 may fetch and execute. The processor 102 may be a semiconductor-based microprocessor, a central processing unit (CPU), an application specific integrated circuit (ASIC), a field-programmable gate array (FPGA), and/or other hardware device. The memory 110 may be an electronic, magnetic, optical, or other physical storage device that stores the machine readable instructions 111. The memory 110 may be, for example, Random Access Memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals. The processor 102 may include multiple processors.

The processor 102 may fetch and execute the machine readable instructions 111 to extract IT user behavior from electronic documents to automatically generate cybersecurity rules. Examples of the machine readable instructions 111 are shown as machine readable instructions 120-123. For example, the processor 102 may fetch and execute the machine readable instructions 120 to determine a construct of textual indicators of IT user behavior for parsing an electronic document. The electronic document may describe approved or unapproved IT user behavior. For example, organizations commonly maintain IT policy documents that describe approved or unapproved IT user behavior. Employees may be made to read the IT policy documents and agree to prescribed IT user behavior described in the IT policy documents. The IT policy documents often describe IT user behavior that may impact the organization's adherence to internal IT security compliance mandates and that may also impact industry or government IT security compliance mandates. The IT policy documents may be in the form of electronic documents. An electronic document may include electronic media content (e.g., other than computer programs or system files) that are intended to be used in either an electronic form or as printed output. By way of example, electronic documents may include .pdf files, .doc files, slides, web pages, etc.

A construct of textual indicators of IT user behavior may include a form or an organization of described IT user behavior in an electronic document. For example, IT user behavior may be described using the following construct: <noun> <verb/auxiliary verb/adverb> <adjective><noun>; and more specifically:
<computer_user_noun> <IT_auxiliary_verb> <IT_actions_or_behavior><noun>.

This construct may be stored or programmed in the machine readable instructions 111 to identify textual indicators of IT user behavior when parsing the electronic document. The textual indicators identify IT user behavior. In an example, the textual indicators are words that may be indicative of IT user behavior. Table 1 below is a non-limiting, non-comprehensive list of textual indicators.

TABLE 1

| User Noun (s) | Auxiliary Verb | Behavior Related |
| --- | --- | --- |
| Computer user(s) | Can | copy |
| Enrolled user(s) | commitment | browse |
| Enrolled personnel | Could | click on |
| User(s) | Not allowed | use |
| System users | May not | install |
| Company employees | Might | change |
| Account holders | Must | post |
| Provisioned users | necessity | Log-on |
| Company personnel | need | e-mail |
| Computer account holders | obligation | forward |
| Privileged users | ought | exchange |
| System administrators | shall | use |
| Sys admins | will | edit |
| Users | cannot | enroll |

As indicated above, the construct may include types of textual indicators, such as nouns describing computer users, auxiliary verbs, terms describing IT actions and IT user behavior, and nouns. Table 1 includes types or categories of textual indicators (e.g., noun, auxiliary verb, etc.), and textual indicators are categorized under each type of textual indicator. Column 1 shows examples of nouns describing computer users. Column 2 shows examples of auxiliary verbs. An auxiliary verb is a verb that may be used in conjunction with a noun in column 1. Column 3 includes examples of terms describing IT actions and IT user behavior.

Another example of a construct that may be used to extract textual indicators of IT user behavior may include a construct that identifies numeric or advisory constraints on IT user behavior. Generally this takes the following form:
<noun> <verb/auxiliary verb> <adjective> [<optional advice/numerical constraint clause> . . . ];
and more specifically:
<computer_user_noun> <IT_auxiliary_verb> <IT_actions_or_behavior> [<optional_IT_advice/numerical_constraint_clause> . . . ]

For instance, while an organization might have a prohibition, such as "Enrolled users will not be allowed to install applications without prior approval", a policy document may have a more complex constraint, such as "Enrolled users can only install three applications per month without prior approval." In these cases, the processor 102 parses the sentence in the electronic document to identify the clauses with the numerical or general advice stipulations. IT advice and numerical constraint clauses, which are also textual indicators of IT user behavior, may be predetermined and stored in a table similar to the examples of textual indicators shown in table 1. The processor 102 may parse sentences in an electronic document to search for text associated with IT policy and numerical constraint clauses that follow the construct.

Extracting the textual indicators is further described. The processor 102 may fetch and execute the machine readable instructions 121 to extract the textual indicators of IT user behavior from an electronic document according to a construct or multiple constructs, such as discussed above with respect to the construct examples. For example, the categorized textual indicators are stored. The processor 102 searches for the textual indicators that conform to the form of the construct. For example, the construct specifies the types of textual indicators to search for, and an order for identifying each of the types of textual indicators when parsing sentences in the electronic document. A set of textual indicators may be determined for each type of textual indicator. In an example, a set of textual indicators may be provided by another system or a human that are for a particular type of textual indicator, and stored in a data storage. Examples of sets of textual indicators for each type of textual indicator are shown in the columns of table 1. When parsing a sentence, the processor 102 searches for each type of textual indicator identified in the sentence, and extracts a textual indicator from the corresponding set of textual indicators. For example, the processor 102 searches for a noun from column 1; followed by an auxiliary verb from column 2; followed by an IT behavior term from column 3; followed by a noun, and extracts them if identified. Multiple constructs may be used for the parsing.

In an example, an NLP application, such as with NLTK for Python®, can be programmed to identify and parse sentences from the electronic document and extract textual indicators, such as terms, of IT user behavior that follow a construct. The extracted textual indicators may be indicative of approved or unapproved IT user behavior specified in the electronic document. The terms in table 1 may be expanded to include plurals or other forms of the words in the table, and the words may also be expanded by using an appropriate glossary, thesaurus, or synonym reference.

The processor 102 may fetch and execute the machine readable instructions 122 to generate a rule associated with monitoring the IT user behavior associated with the extracted textual indicator. The generated rule may include the IT user behavior to monitor which is described by the extracted textual indicators. In an example, the rule, including the extracted textual indicators, may be included in a schema or format understood by an IT behavior monitoring tool. The IT behavior monitoring tool may include an enterprise security application, network monitoring tool, etc., which may be commercially available. The IT behavior monitoring tool may allow a user to enter or import conditions that can be monitored to identify cybersecurity threats.

Figure 2:
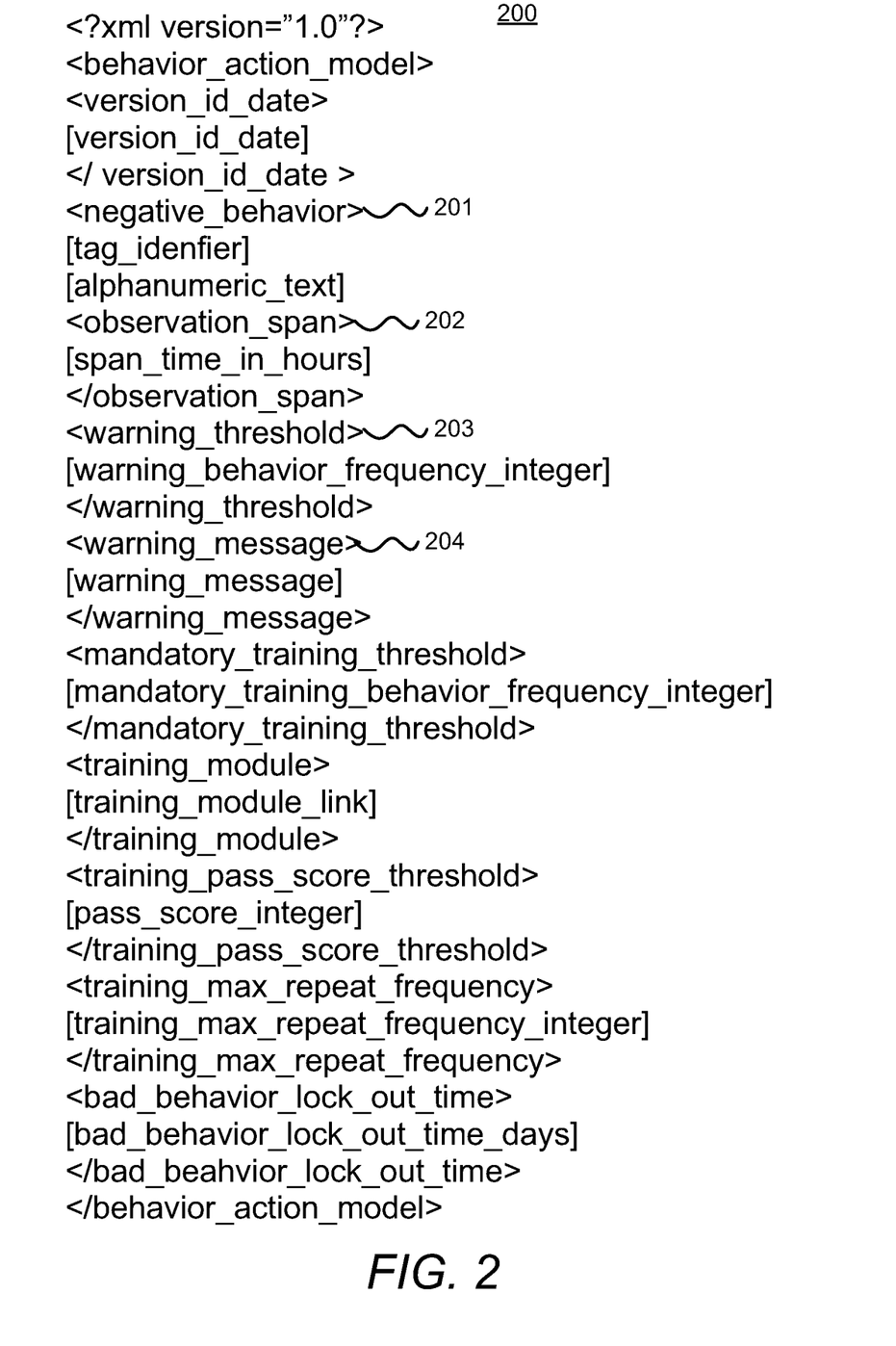
FIG. 2 illustrates an IT user behavior model, according to an example.

The processor 102 executing the machine readable instructions 122 may include a monitoring condition or constraint with the rule. The monitoring condition may include numeric or general advice stipulations specified in the extracted textual indicators. Further examples of monitoring conditions are discussed below with respect to IT user behavior model 200 and are depicted in FIG. 2. The monitoring condition may be formatted to a format used by the IT behavior monitoring tool, such as according to a predetermined schema. The monitoring condition may be transmitted to the IT behavior monitoring tool through an application program interface (API) or networked based communication of the IT behavior monitoring tool. The IT behavior monitoring tool, receiving the monitoring condition through its API (or network connection), may determine that the received information is a monitoring condition and start actively monitoring for the condition.

In an example, the processor 102 executing the machine readable instructions 111 may generate an IT user behavior model that includes rules determined from the textual indicators of IT user behavior extracted from electronic documents according to constructs. Rules are determined, such as described above with respect to the processor executing the machine readable instructions 122. The rules may be for unapproved IT user behavior. Examples of the rules may include rules associated with the following unapproved IT user behavior, such as visiting unapproved websites; installing unauthorized software; opening attachments from unrecognized e-mail sender; unusual frequent access to corporate file servers maintaining sensitive organization data; frequent USB use; installing old versions of approved software that have known security vulnerabilities; making public media posts with disparaging comments about organization; etc. A rule may specify an IT user behavior to monitor and monitoring conditions for monitoring the behavior. If the monitoring conditions are detected, a remedial action may be triggered.

To create the IT user behavior model, the processor 102 determines configuration information specifying when and how the rules are applied, such as by the IT behavior monitoring tool or by other applications. Examples of the configuration information are now described. Observation span may include a time span over which a tracked user behavior is aggregated. For instance, an IT user behavior may be collected and reviewed over a 7 day interval. Warning threshold may include instances of an observed IT user behavior above which a remedial action is taken, such as sending a warning e-mail message to the user, suspending privileges, and attending mandatory training. For example a company may have a policy that if it is detected that a user clicks on an e-mail attachment once, from an unrecognized e-mail address, a waning message is sent to the user regarding that behavior. In this case the threshold is one instance. Warning message is the actual text of the warning message that will be sent to the user when the warning threshold for the behavior in question is exceeded. Mandatory training threshold may specify the number of instances of an observed behavior above which the user is to attend mandatory training, such as to get revoked privileges reinstated. A training module may be specified that includes a link to remedial training curricula related to detected unapproved behavior. For instance, the link may be a web address a user clicks on to take an online training course. Constraints may be specified regarding the training, such as a training pass score threshold that indicates the minimum score to pass the training which may be identified by the training module; a number of times a user is able to repeat taking a training course; and if a training course is not completed and passed within a specified duration, whether the user can get their privileges restored through another process.

FIG. 2 shows an example of an IT user behavior model 200 or a portion of an IT user behavior model. The IT user behavior model 200 includes a rule or multiple rules. Each rule may specify an IT user behavior to monitor and also may include a condition or multiple conditions for monitoring the IT user behavior. Some examples of the fields may include the name of the model and version ID. The model 200 may specify a rule which identifies an IT user behavior to monitor, which is labeled as 201. Labels 202-204 identify some of the monitoring conditions or constraints shown in the model 200 which are also discussed above. For example, 202 identifies a variable for observation span, and a value may be specified for the variable, such as in terms of hours. 203 identifies a variable for warning threshold, and 204 identifies a variable for a warning message, both of which are discussed above. The model 200 includes other variables which are shown and discussed above as well. Rules in the model 200 may be generated from the extracted textual indicators. Also, a rule may be specified out of band from automated processing.

Once the IT user behavior model 200 is created and is populated with values for the variables, the model may be used by the IT monitoring tool to monitor IT user behavior specified in the model 200, and to trigger remedial actions in response to detecting specified conditions, which may include the constraints discussed above. Also, the processor 102 may execute remedial actions, including implementing delivery of training modules, which may include online training courses.

Figure 3:
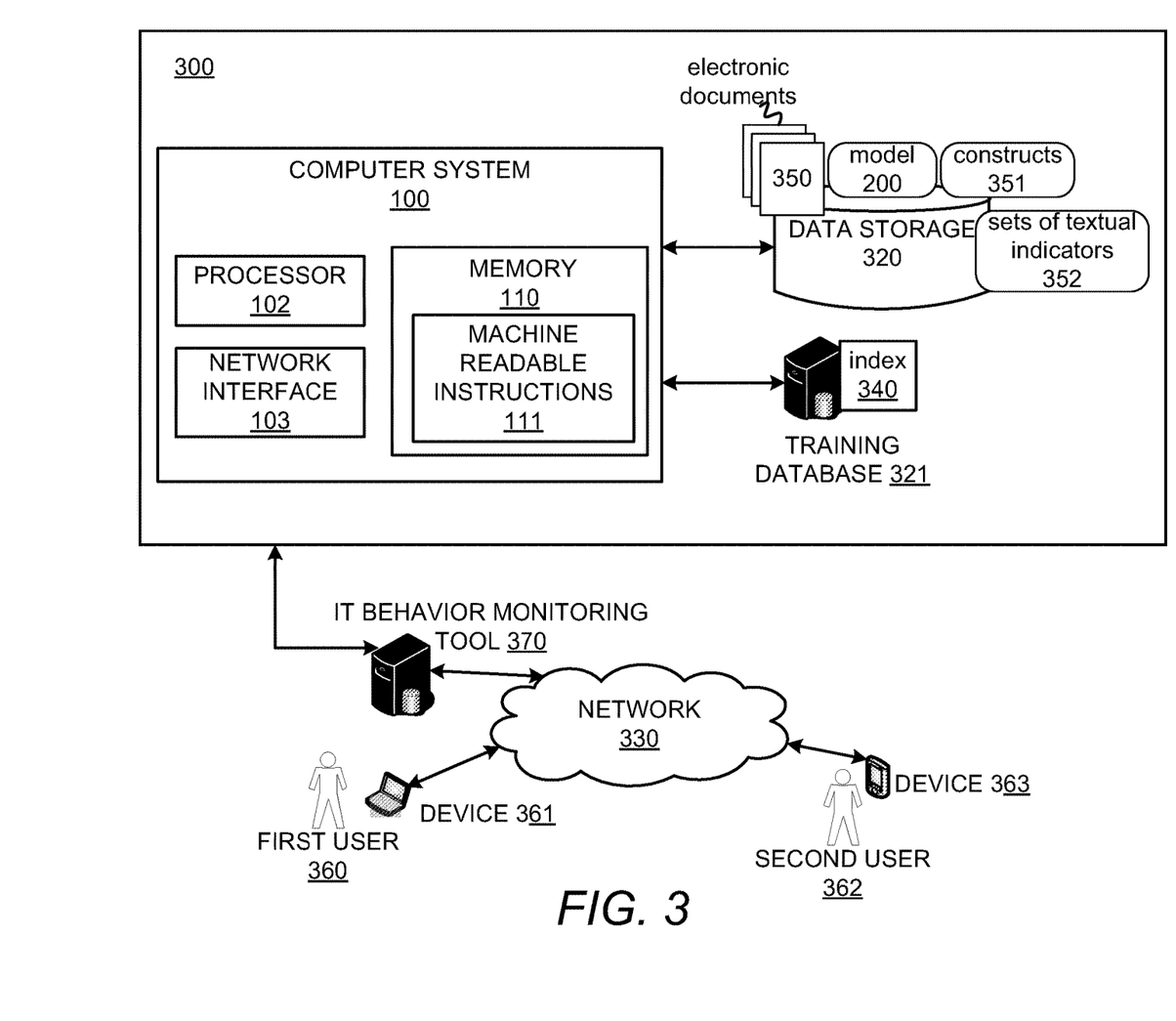
FIG. 3 illustrates a system, according to an example.

FIG. 3 shows an example of a system 300 according to an example. The system 300 may include the computer system 100, data storage 320 and training database 321. The computer system 100 is described with respect to FIG. 1 and may include a network interface 103 for communicating with other computers over a network. The data storage 320 may include a data storage system to store data and other information used by the computer system 100. Examples of the information stored in the data storage 320 may include electronic documents 350 that describe IT security policy, IT user behavior model 200, constructs 351 and sets of textual indicators 352. The constructs 351 and sets of textual indicators 352 may be used to extract textual indicators from the electronic documents 350 and generate rules for monitoring IT user behavior. The data storage 320 may include multiple types of storage systems. For example, a file repository may store the electronic documents 350, and a database or other type of storage system may store other information and data. In an example, a training database 321 may be used to store training modules, and the training database 321 may be part of the data storage 320 or a separate storage system. The training database 321 is further described below.

FIG. 3 also shows IT behavior monitoring tool 370 connected to network 330 to monitor IT user behavior, for example, based on rules determined by the computer system 300. Users, such as first user 360 and second user 362, may be connected to the network 330 through their electronic devices, such as devices 361 and 363. The electronic devices 361 and 363 may include desktops, laptops, smartphones, tablets or other types of end user devices or computers. The IT behavior monitoring tool 370 can monitor IT user behavior performed on the electronic devices 361 and 363. The IT behavior monitoring tool 370 may access log files and perform other monitoring actions to monitor IT user behavior. The behavior monitoring tool 370 may also employ agents that reside on the user devices 361 and 363.

Examples of operations performed by the system 300 or in conjunction with the system 300 are now described. For example, the computer system 100 parses the electronic documents 350 to determine rules, such as described with respect to FIG. 1, and to populate the IT user behavior model 200. The IT user behavior model 200 may be provided to the IT behavior monitoring tool 370 in a format usable by the IT behavior monitoring tool 370, such as XML. The computer system 100 may securely transmit the IT user behavior model 200 to the IT behavior monitoring tool 370 over a network (such as the network 330 or another network) using and established IT networking security protocol such as Transport Layer Security (TLS) otherwise known as Secure Sockets Layer (SSL).

The IT behavior monitoring tool 370 monitors IT user behavior specified in the IT user behavior model 200. The IT behavior monitoring tool 370 may send results of the monitoring to the computer system 100. The results may include detected conditions specified in the IT user behavior model 200. The computer system 100 may store the monitoring results received from the IT behavior monitoring tool 370. The computer system 100 may also execute remedial actions if conditions are detected that are specified in the rules included in the IT user behavior model 200. For example, a warning message may be transmitted to a user when a warning threshold for the IT user behavior is exceeded. Also, access privileges may be revoked, such as by suspending privileges in an active directory maintained by a directory service. The directory may store privileges for users to access applications, shared storage, networks, or other IT resources. If a user performs an unapproved IT behavior, an access privilege associated with the unapproved IT behavior may be revoked in the directory. For example, the user may have their ability to access the Internet revoked if they visited disapproved websites. The access privilege may be reinstated if the user passes online training. In another example, the computer system implements training. For example, if a count of occurrences of IT user behavior is exceeded within a specified span of time, taking training may be required to get access privileges reinstated. The computer system may send a link to the user that allows the user to take the training. The training may be online. In an example, the computer system 100 may automatically generate the training questions based on the textual indicators extracted from the electronic documents 350.

The automated generation of training questions from extracted textual indicators is now described. For the IT user behaviors that are determined from the electronic documents 350 and monitored by the IT behavior monitoring tool 370, the computer system 300 may create training packages which can instruct users engaging in the monitored the IT user behaviors, what is approved and what is unapproved IT user behavior. The training package may be web based, although it is not limited to that media. Other forms of instruction communications could also be used; for example, video. Training may also be performed to re-inforce approved IT user behavior.

The processor 102 executing the machine readable instructions 111 may create a training package, once again, leveraging, NLP technology. An index 340 may be maintained that associates each IT user behavior extracted from the electronic documents 350 with associated text from the electronic documents 350.

The following is an example of text from an electronic document that specifies a company's policy on installing software on company computers:
Software Installation on Company Computers Enrolled users are generally never allowed to install software on their company owned computers. Instead, they must submit a request to the IT department indicating the software title they wish installed and the reason for doing so. It is important that employees follow this procedure, as the IT department will have the most up to date information regarding particular versions of software which may have known vulnerabilities or bugs. Further, some software titles may be simply inappropriate on your computer. This measure also serves as a cost saving measure for the company. Other people in the company may have already requested installation of the software of interest and the company may have already negotiated a special purchase price for an additional license for the software. There is an exception to this policy and that is if the software is needed in an emergency situation to satisfy an urgent customer need. In this case the software may be installed, but you must inform the IT department within 24 hours so they can further evaluate the situation. This exception should be used sparingly. If a user attempts to do this more than three times in a calendar year, their IT privileges will be suspended for one week.

This information is extracted and placed into a database table in the training database 321 and is indexed in the index 340 to extracted IT user behavior. Test questions are created from the text associated with the extracted IT user behavior identified according to the index 340. For example, multiple choice or true/false questions may be created. For example, policy statement sentences following the construct: noun→adverb/auxiliary verb/verb→adjective→noun, could be extracted and posed as true or false questions. For example, the first sentence in the example policy document above is a perfect candidate:
1) True or False. Employees are generally never allowed to install software on their company owned computes.
or
2) True or False. There is an exception to this policy and that is if the software is needed in an emergency situation to satisfy an urgent customer need.

When the extraction is verbatim, the answer is always true (as in these two examples). Creating multiple choice questions may include replacing an adverb with another adverb or eliminating the adverb. The following is an example of a multiple choice question generated using the first sentence where the answers are annotated to explain how they were created:
1) Select the statement that is most accurate
a. Employees are generally allowed to install software on their company owned computers. (adverb "never" removed).
b. Employees are generally never allowed to install software on their company owned computers (correct original sentence).
c. Employees are sometimes allowed to install software on their company owned. computers (adverbs "generally" and "never" replaced with new adverb "sometimes")
d. None of the above.

Another example is as follows whereby the indefinite article in the sentence is changed:
2) Select the statement that is most accurate
a. There is an exception to this policy and that is if the software is needed in an emergency situation to satisfy an urgent customer need. (correct original sentence)
b. There is no exception to this policy. (indefinite article "an" replaced with adverb "no" and rest of sentence truncated after the noun)
c. There are several exceptions to this policy (verb "is" replaced with verb "are several"; the noun "exception" pluralized; rest of sentence truncated after the noun)
d. None of the above Test questions can be placed in the training database 321 or another database and accessed dynamically to construct test questions for an extracted IT user behavior based on an association identified from the index 340. The training material itself may include the entire paragraph; although descriptions for one behavior could exceed one paragraph. Also, a training package may be created using human generated questions, and the processor 102 may randomly select questions for the test package that are related to an IT user behavior being tested.

The processor 102 can dynamically create a training package. IT user behaviors that were extracted, for example, such as described with respect to FIG. 1 are used to perform a lookup in the index 340 to identify associated text. The processor 102 generates questions from the associated text, for example, such as described with respect to the true/false or multiple choice examples discussed above. If questions for the associated text are already stored, questions may be randomly selected. A grade that is considered to be passing may be stored and used to determine whether a user has sufficiently completed the training. If multiple training packages are available for an IT user behavior, one curriculum may be randomly selected. If the user has taken a specific training course before, then a training package may be selected that the user has not previously viewed.

Figure 4:
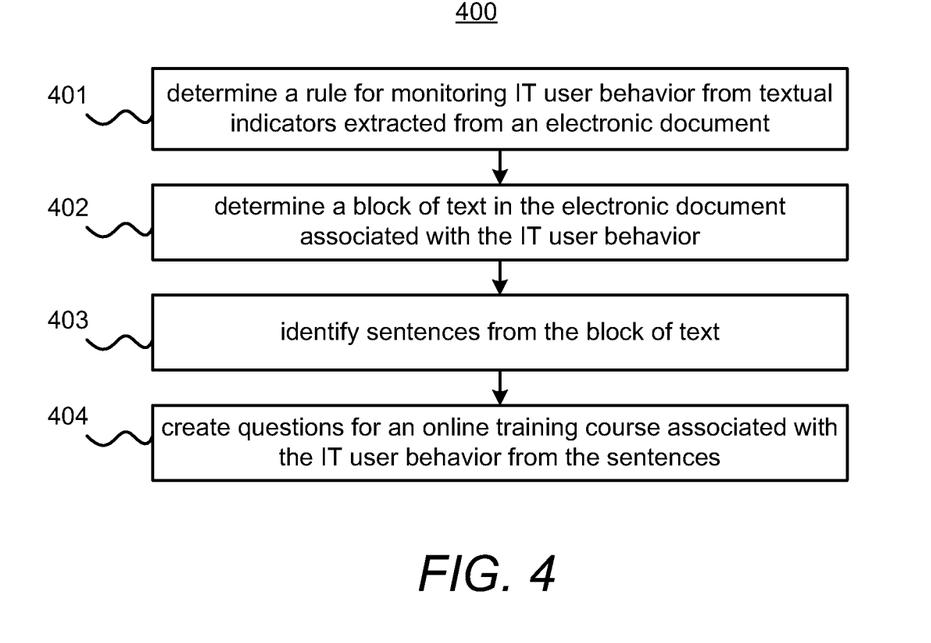
FIG. 4 illustrates a method, according to an example.

FIG. 4 illustrates a method 400 according to an example. The method 400 may be performed by a computer, such as the computer system 100. The method 400 may be performed by the processor 102 executing machine readable instructions 111.

At 401, a rule for monitoring IT user behavior is determined from textual indicators extracted from an electronic document. Determining the rule may be determined such as described with respect to FIG. 1. At 402, a block of text in the electronic document that is associated with the IT user behavior is determined. For example, a paragraph is identified that includes the extracted textual indicators. At 403, sentences from the block of text are identified. At 404, questions for an online training course that are associated with the IT user behavior are created from the sentences. Examples of creating the questions are discussed above and may include replacing or removing at least one of a verb, adverb or noun in a sentence.

While the embodiments have been described with reference to examples, those skilled in the art will be able to make various modifications to the described embodiments without departing from the scope of the claimed embodiments.

What is claimed is:

1. A computer system comprising:
   at least one processor;
   a memory having stored thereon machine readable instructions which, when executed by the at least one processor, causes the computer system to:
   determine a construct of textual indicators of information technology (IT) user behavior for parsing an electronic document;
   extract the textual indicators of IT user behavior from the electronic document according to the construct, the extracting further comprising:
      extract, from the electronic document, at least a pre-defined user type, an auxiliary verb, and a corresponding action associated with a given textual indicator based on natural language processing (NLP), the pre-defined user type, auxiliary verb, and corresponding action defining a given textual indicator;
   generate a rule associated with monitoring the IT user behavior, wherein the rule includes at least one condition for monitoring the IT user behavior, the at least one condition corresponding to an observation span describing a time span over which the IT user behavior is aggregated;
   create an IT user behavior model including IT user behaviors extracted from the electronic document; and
   monitor conditions associated with each extracted IT user behavior, the monitoring further comprising:
      receive an indication that a monitoring condition associated with at least one IT user behavior for a user is detected;
      perform at least one operation based at least in part on detection of the monitoring condition associated with at least one IT user behavior for the user, wherein performing the at least one operation further comprises:
         determine that a threshold number of instances of the at least one IT user behavior for the user have been detected over a period of time;
         revoke an access privilege associated with the user in response to determining the threshold number of instances of the at least one IT user behavior for the user over the period of time;
         provide an online training course associated with the IT user behavior in response to determining the threshold number of instances of the at least one IT user behavior for the user over the period of time, wherein completion of the online training course reinstates the revoked access privilege associated with the user;
         determine a completion of the online training course by the user; and
         reinstate the access privilege associated with the user in response to the completion of the online training course.

2. The computer system of claim 1, wherein the construct specifies types of the textual indicators and an order for identifying each of the types of the textual indicators when parsing the electronic document.

3. The computer system of claim 2, wherein to extract the textual indicators of IT user behavior from the electronic document comprises:
   determine a set of textual indicators for each type of the textual indicators;
   parse a sentence in the electronic document to identify the types of textual indicators in the order specified by the construct; and
   for each type of textual indicator identified in the sentence, extract, from the sentence, a textual indicator that is in the corresponding set of textual indicators.

4. The computer system of claim 1, wherein a remedial action is triggered in response determining the threshold number of instances of the at least one IT user behavior for the user over the period of time.

5. The computer system of claim 1, wherein the IT user behavior model is in a format usable by an IT behavior monitoring tool to monitor for the IT user behaviors, and the machine readable instructions when executed by the at least one processor, cause the computer system to:
   transmit the IT user behavior model to the IT behavior monitoring tool.

6. The computer system of claim 1, wherein the machine readable instructions when executed by the at least one processor, cause the computer system to:
   create the online training course associated with the IT user behavior, wherein the online training course includes at least one question extracted from the electronic document based on the construct of textual indicators of information technology (IT) user behavior.

7. The computer system of claim 6, wherein to create the online training course, the machine readable instructions when executed by the at least one processor, cause the computer system to:
   create an index associating the IT user behavior with a block of text in the electronic document; and
   create one or more questions for the online training course from the block of text.

8. The computer system of claim 7, wherein to create questions for the online training course, the machine readable instructions when executed by the at least one processor, cause the computer system to:
   identify a sentence from the block of text; and
   replace or remove at least one of a verb, adverb, or noun in the sentence.

9. A computer-implemented method executable by at least one processor, the method comprising:
   determining a rule for monitoring IT user behavior from textual indicators extracted from an electronic document, wherein the rule includes at least one condition for monitoring the IT user behavior, the at least one condition corresponding to an observation span describing a time span over which the IT user behavior is aggregated, the determining further comprising:
- extracting, from the electronic document, at least a pre-defined user type, an auxiliary verb, and a corresponding action associated with a given textual indicator based on natural language processing (NLP), the pre-defined user type, auxiliary verb, and corresponding action defining a given textual indicator;
- determining a block of text in the electronic document associated with the IT user behavior;
- identifying sentences from the block of text;
- creating questions for an online training course associated with the IT user behavior from the sentences;
- determine that a threshold number of instances of the IT user behavior have been detected for a user over a period of time;
- providing the online training course associated with the IT user behavior for completion by the user whose access privilege was revoked in response to determining the threshold number of instances of the IT user behavior for the user over the period of time, wherein completion of the online training course reinstates the revoked access privilege associated with the user;
- determining a completion of the online training course by the user; and
- reinstating the revoked access privilege associated with the user in response to the completion of the online training course.

10. The computer-implemented method of claim 9, wherein creating questions comprises:
- replacing or removing at least one of a verb, adverb, or noun in the sentences to create true or false or multiple choice questions.

11. The computer-implemented method of claim 9, comprising:
- receiving an indication that a monitoring condition associated with the IT user behavior for the user is detected; and
- sending the user a link to the online training course in response to receiving the indication.

12. A computer system comprising:
at least one processor;
a memory having stored thereon machine readable instructions which, when executed by the at least one processor, causes the computer system to:
- determine a construct of textual indicators of information technology (IT) user behavior for parsing an electronic document;
- extract the textual indicators of IT user behavior from the electronic document according to the construct, the extracting further comprising:
  - extract, from the electronic document, at least a pre-defined user type, an auxiliary verb, and a corresponding action associated with a given textual indicator based on natural language processing (NLP), the pre-defined user type, auxiliary verb, and corresponding action defining a given textual indicator;
- generate a rule for monitoring the IT user behavior, wherein the rule includes at least one condition for monitoring the IT user behavior, the at least one condition corresponding to an observation span describing a time span over which the IT user behavior is aggregated;
- determine a block of text in the electronic document associated with the IT user behavior;
- identify sentences from the block of text;
- create questions for an online training course associated with the IT user behavior from the sentences;
- determine that a threshold number of instances of the IT user behavior have been detected for a user over a period of time;
- provide the online training course associated with the IT user behavior for completion by the user whose access privilege was revoked in response to determining the threshold number of instances of the IT user behavior for the user over the period of time, wherein completion of the online training course reinstates the revoked access privilege associated with the user;
- determine a completion of the online training course by the user; and
- reinstate the revoked access privilege associated with the user in response to the completion of the online training course.

13. The computer system of claim 12, wherein creating questions comprises:
- replacing or removing at least one of a verb, adverb, or noun in the sentences to create true or false or multiple choice questions.

14. The computer system of claim 12, wherein the instructions further cause the computer system to perform:
- receiving an indication that a monitoring condition associated with the IT user behavior for the user is detected; and
- sending the user a link to the online training course in response to receiving the indication.

* * * * *